United States Patent
Kawano et al.

(10) Patent No.: US 6,416,591 B1
(45) Date of Patent: Jul. 9, 2002

(54) NON-ORIENTED ELECTROMAGNETIC STEEL SHEET HAVING EXCELLENT MAGNETIC PROPERTIES AFTER STRESS RELIEF ANNEALING AND METHOD OF MANUFACTURING THE SAME

(75) Inventors: Masaki Kawano, Okayama; Yoshihiro Ozaki, Chiba; Atsuhito Honda, Okayama, all of (JP)

(73) Assignee: Kawasaki Steel Corporation, Hyogo (JP)

( * ) Notice: Subject to any disclaimer, the term of this patent is extended or adjusted under 35 U.S.C. 154(b) by 0 days.

(21) Appl. No.: 09/920,749

(22) Filed: Aug. 3, 2001

Related U.S. Application Data (62) Division of application No. 09/240,630, filed on Feb. 1, 1999, now Pat. No. 6,290,783.

(51) Int. Cl.$^7$ ................................................. H01F 1/16
(52) U.S. Cl. .................................... 148/113; 148/111
(58) Field of Search ............................... 148/110–113

(56) References Cited

U.S. PATENT DOCUMENTS

| | | |
|---|---|---|
| 3,960,616 A | 6/1976 | Evans et al. |
| 4,204,890 A | 5/1980 | Irie et al. |
| 4,338,143 A | 7/1982 | Shimoyama et al. |
| 5,730,810 A | 3/1998 | Takashima et al. |

*Primary Examiner*—John Sheehan
(74) *Attorney, Agent, or Firm*—Young & Thompson

(57) ABSTRACT

A finish annealed non-oriented electromagnetic steel sheet includes about 0.01 wt % or less of C, greater than about 1.0 wt % and at most about 3.5 wt % of Si, at least about 0.6 wt % and at most about 3.0 wt % of Al, at least about 0.1 wt % and at most about 2.0 wt % of Mn, at least about 2 ppm and at most about 80 ppm of one or more rare earth metals (REM), a maximum content of Ti and Zr being about 15 ppm and 80 ppm, respectively, wherein oxygen on the surface layer of the steel sheet is 1.0 g/e$^2$ or less. Since the non-oriented electromagnetic steel sheet has desirable mechanical properties resulting from the increased amounts of Si and Al, a high magnetic flux density can be maintained without sacrificing a punching property as well as very low iron loss can be obtained even after stress relief annealing.

12 Claims, 1 Drawing Sheet

FIGURE

NON-ORIENTED ELECTROMAGNETIC STEEL SHEET HAVING EXCELLENT MAGNETIC PROPERTIES AFTER STRESS RELIEF ANNEALING AND METHOD OF MANUFACTURING THE SAME

CROSS-REFERENCE TO RELATED APPLICATIONS

This application is a divisional of application Ser. No. 09/240,630, now U.S. Pat. No. 6,290,783, filed Feb. 6,1999.

BACKGROUND OF THE INVENTION

1. Field of the Invention

The present invention relates to a non-oriented electromagnetic steel sheet having excellent magnetic properties after stress relief annealing and a method of manufacturing the same.

2. Description of the Related Art

Non-oriented electromagnetic steel sheets have been used as the iron core materials of motors, transformers, and the like. It is desirable to lower the iron loss of the non-oriented electromagnetic steel sheet in order to increase the energy efficiency of these devices.

Recently, it has become especially important to make the motors more efficient. Accordingly, it is desired to improve the magnetic properties of the non-oriented electromagnetic steel sheet, in particular, to increase its magnetic flux density and lower its iron loss. Also, the rotor unit thickness of a DC brushless motor, for example, is reduced up to about 5 mm by embedding a permanent magnet into a rotor. Accordingly, adequate mechanical strength, which has not been important in conventional small motors, is also required for the non-oriented electromagnetic steel sheet, in addition to the magnetic properties. That is, there is required an electromagnetic steel having excellent magnetic properties and adequate mechanical strength as a material for small motors of high efficiency.

As a means for reducing the iron loss of the non-oriented electromagnetic steel sheet, there is available a method of optimizing a grain size and a method of improving the specific resistance of the steel sheet. That is, it is well known that the iron loss is minimized by the grain size of about 150–200 $\mu$m, that the addition of Si or Al is effective to improve a specific resistance, and that mechanical properties depend on Si and Al in steel.

On the other hand, it is also well known that a problem arises in that a saturation magnetic flux density is reduced and the punching property of steel sheet is deteriorated when the content of Si or Al is increased. In particular, the punching property is a very important property for the non-oriented electromagnetic steel sheet. Non-oriented electromagnetic steel sheet is often used by users after it is punched to a prescribed shape and then subjected to stress relief annealing. Since the punched shape is complicated and requires accuracy, a precise punching property is required for the non-oriented electromagnetic steel sheet. The punching property is deteriorated by the increase of the hardness and grain size of the electromagnetic steel sheet. The increase of the hardness and grain size results from an increase in the alloying components of the steel sheet or scales formed on the surface of the steel sheet. For example, when Si exceeds 1.0 wt % or when the grain size of a finished steel sheet exceeds 40 $\mu$m, a problem arises in that the punching property is deteriorated.

Accordingly, the recent demand for higher motor efficiency and adequate mechanical strength requires a material having an excellent grain-growing property after stress relief annealing, which thereby has a high magnetic flux density and very low final iron loss without sacrificing its punching property.

This need can be met by sufficiently increasing the Si and Al content thereby to coarsen the crystal grains. In particular, it is preferred to increase the content of Al because it has less effect on increased hardness. Also, it is preferred to coarsen crystal grains because it reduces the iron loss after stress relief annealing. More specifically, although Si and Al have the same degree of specific resistance increasing effect, the Al content is increased because the effect of Al per unit weight on the increase of hardness is about one half that of Si. On the other hand, although increasing the stress relief annealing temperature is effective to coarsen crystal grains, the grain growing property must be improved in a relatively low stress relief temperature region of about 750° C. at the highest, which is employed in practice due to cost considerations.

Japanese Unexamined Patent Publication No. 8-3699 discloses a low Si non-oriented electromagnetic steel sheet in which a Si component is lowered to 1.0 wt % or less to obtain an excellent growing property after stress relief annealing and a low final iron loss. The grain growing property of the non-oriented electromagnetic steel sheet is greatly improved by-adding REM (rare earth metals) to the steel and highly purifying the steel during the steel-making process. High purity is accomplished by suppressing the contents of Ti and Zr, which are elements contained in a trace amount. Precipitates which deteriorate grain growth are controlled by REM-addition or purification. According to the publication, this works remarkably well; however, due to the low Si content, the problem arises that the mechanical strength is insufficient for some locations where the steel sheet is used and iron loss of the sheet is insufficient to meet the need for a greater reduction in iron loss of the cores.

Japanese Examined Patent Publication No. 61-4892 seeks-to improve magnetic properties by increasing the Al content. However, although mechanical properties were improved by the increase of only the Al content, the magnetic properties were-greatly altered. In particular, a low loss product could not be obtained stably after stress relief annealing as described later. It has been found by the inventors that the above problem is caused by nitriding during the stress relief annealing.

In Japanese Unexamined Patent Publication No. 8-296007, it is disclosed that the deterioration of the magnetic properties of a steel sheet containing a large content of Al is suppressed by controlling C contained in an insulating film, because the deterioration is caused by nitriding in stress relief annealing. According to the publication, however, although the change in magnetic properties is reduced, the degree of reduction remains insufficient and it is necessary to suppress the change altogether.

SUMMARY OF THE INVENTION

Accordingly, it is an object of the present invention to provide a non-oriented electromagnetic steel sheet having not only excellent magnetic properties after stress relief annealing but also excellent mechanical properties, and to propose an advantageous manufacturing method for the non-oriented electromagnetic steel sheet.

The inventors have investigated the levels to which Al and Si should be set, on the premise that REM is added and a steel sheet is highly purified in order to more greatly reduce iron loss after stress relief annealing and to improve mechanical properties. As a result, the inventors have confirmed that an increase in Al content reduces iron loss without significantly deteriorating a punching property, and is accordingly suitable for the improvement of magnetic properties. However, a serious problem had still arisen in that the magnetic properties were still altered after stress relief annealing due to the increase in an Al content. As a result of a diligent study to solve the above problem, the inventors have newly found that it is very important, in a non-oriented electromagnetic steel sheet whose iron loss is intended to be reduced after stress relief annealing, to control surface scales produced during finish annealing in addition to making the components and precipitates in a steel adequate, in order to simultaneously achieve good mechanical properties and the stable improvement of iron loss after stress relief annealing by an increase in Si and Al contents.

The present invention results from the above discovery.

According to the present invention, a non-oriented electromagnetic steel sheet comprises at most about 0.01 wt % of C, greater than 1.0 wt % and at most about 3.5 wt % of Si, at least about 0.6 wt % and at most about 3.0 wt % of Al, at least about 0.1 wt % and-at most about 2.0 wt % of Mn, at least about 2 ppm and at most about 80 ppm of REM, with Ti and Zr being suppressed to at most about 15 ppm and 80 ppm, respectively, wherein the amount of oxygen on the metal surface layer of the steel sheet is 1.0 g/m$^2$ or less after finish annealing.

It is preferable that the non-oriented electromagnetic steel sheet further comprises at least about 0.002 wt % and at most about 0.1 wt % of at least one of Sb and Sn.

It is advantageous for the stable improvement of magnetic properties that the non-oriented electromagnetic steel sheet further comprises S, 0 and N suppressed to 20 ppm or less, 15 ppm or less and 30 ppm or less, respectively, and that the ratio of the number of REM-containing inclusions coupled with nitride to the number of REM-containing inclusions having a diameter of at least about 1 μm in the steel sheet is 40% or more.

The non-oriented electromagnetic steel sheet is manufactured by the steps of hot rolling and cold rolling a steel slab comprising-at most about 0.01 wt % of C, greater than 1.0 wt % and at most about 3.5 wt % of Si, at least about 0.6 wt % and at most about 3.0 wt % of Al, at least about 0.1 wt % and at most about 2.0 wt % of Mn, at least about 2 ppm and at most about 80 ppm of REM, with Ti and Zr being suppressed to at most about 15 ppm and 80 ppm, respectively, and subjecting the thus rolled steel sheet to finish annealing by adjusting at least one of a dew point and a gas atmosphere to thereby control the amount of oxygen on the metal surface layer of the steel sheet to 1.0 g/m$^2$ or less.

It is preferable that the steel slab used in this method-further comprises at least about 0.002 and at most about 0.1 wt % of at least one of Sb and Sn.

In these manufacturing methods, it is advantageous to the stable improvement of magnetic properties that when a molten steel is made, REM is added after S and O in the molten steel is adjusted to 40 ppm or less and 25 ppm or less, respectively, to thereby suppress S and O to 20 ppm or less and 15. ppm or less, respectively, as well as N is adjusted to 30 ppm or less so that the ratio of the number of REM-containing inclusions coupled with nitride to the number of REM-containing inclusions having a diameter of at least about 1 μm in the steel sheet is 40% or more after finish annealing.

In the manufacturing-methods of the present invention, it is preferable that the hot-rolled sheet is annealed for 40 seconds or less at 700° C. or more to 1150° C. or less after the hot-rolling and that the finish annealing is performed in a soaking time of 15 seconds or less at 750° C. or more to 900° C. or less.

DESCRIPTION OF PREFERRED EMBODIMENTS

Embodiments of the present invention will be specifically described below.

At first, the reasons for the disclosed contents of the respective components will be described.

C: 0.01 wt % or less

Since C deteriorates magnetic properties by the precipitation of carbide, it should be limited to 0.01 wt % or less.

Si: greater than about 1.0 wt % and at most about 3.5 wt %

Si is a component useful to reduce iron loss by increasing a specific resistance. When the content of Si is 1.0 wt % or less, reduction of the iron loss is insufficient and mechanical properties do not improve. So the content of Si should be greater than 1.0 wt %. By the increase of the Si content, the iron loss can be reduced by increasing the specific resistance and mechanical strength, for example, tensile strength and yield stress can be increased. However, when the Si content is excessively increased; hardness is excessively increased. Consequently, a punching property is deteriorated. Furthermore a cold rolling becomes difficult in manufacture. Therefore, it is. necessary to set the Si content to less than or equal to 3.5 wt %. In particular, it is more preferable to set the Si content to more at least about 1.0 wt % and at most about 2.5 wt %.

Mn: 0.1–2.0 wt %

Since Mn acts to fix S as coarse MnS, Mn should be contained in an amount of 0.1 wt % or more and preferably 0.5 wt % or more. On the other hand, since an excessive increase in the additive amount of Mn deteriorates a magnetic flux density, Mn should be contained in an amount of 2.0 wt % or less and preferably in an amount of 1.5 wt % or less.

Al: at least about 0.6 wt % and at most about 3.0 wt %

Al is an important component in the present invention. Al is an effective element to reduce iron loss in the same degree as Si by increasing the specific resistance of a product. Moreover, Al has a small hardening capability (a hardness increasing amount per unit weight), about one-half that of Si. Consequently, Al is an effective element to suppress the hardening of a product and can improve magnetic properties without sacrificing mechanical properties. Furthermore, since Al is an element which forms precipitates by nitriding, an increase in the additive amount of Al can suppress the dispersion of fine AlN in a manufacturing process and improve a grain growing property in subsequent recrystallization annealing and stress relief annealing. Iron loss is reduced by grain growth. The simultaneous addition of Al and REM can improve the grain growing property greatly as described below. Furthermore, Al has an effect for increasing crystal grains which have [1003] orientation. The [1003] orientation is preferred in terms of magnetic properties.

When Al is contained in an amount less than 0.6 wt %, sufficient mechanical properties cannot be obtained. When Al is contained in an amount greater than 3.5 wt %, a problem arises in the punching property, the cold rolling ability in manufacture, and the excessive deterioration of the magnetic flux density. Therefore, the content of Al is set to at least about 0.6 wt %, at most about 3.5 wt %, and preferably to 0.6 to 1.5 wt %.

REM: 2–80 ppm

The addition of one or more kinds of rare earth elements (REM) in a total amount of 2–80 ppm can avoid the adverse affect of Zr on the growth of grains in stress relief annealing. Zr is inevitably contained in an amount of 5–80 ppm in a steel making process executed on an industrial scale. Furthermore, it has been confirmed that when Al is added in a large amount, the grain growing property can be greatly improved by the further addition of REM. It is predicted that this because the addition of REM changes the precipitated state of other precipitates. Although the reason is not apparent, it is believed that REM oxide and REM sulfide act as a nucleating site when fine precipitates such as Zr nitride or Al nitride precipitate. These effects are insufficient when REM is contained in an amount less than 2 ppm, whereas the excessive addition of REM increases the inclusions formed by REM and a problem arises in that the grain growth is obstructed by REM inclusions themselves. Accordingly, REM is contained in an amount of 80 ppm or less and preferably in an amount less than 50 ppm.

Ti: 15 ppm or less

Ti is set to 15 ppm or less because it greatly deteriorates iron loss by lowering the grain growing property in stress relief annealing executed at a low, temperature even if it is contained in a very small amount. When Ti is set to 10 ppm or less, even better reduction of iron loss can be obtained. It should be noted that the addition of Ti alone is not so effective even if its content is set to 15 ppm or less. On the other hand, the simultaneous addition of Ti and REM can improve the grain growing property during low-temperature stress relief annealing. Although the reason is not apparent, it is believed that REM oxide and REM sulfide act as a nucleus creating site when fine precipitates of such as Ti and the like precipitate. Zr: 80 ppm or less It is preferable to reduce the content of Zr as much as possible because Zr deteriorates the grain growing property in the low temperature stress relief annealing even if it is contained in a very small amount. However, it requires a remarkable increase of production cost to stably set Zr to 5 ppm or less on an industrial scale. Thus, in the present invention Zr is preferably set to 5–80 ppm. Zr becomes harmless in this range which can be stably achieved industrially by the addition of REM. More specifically, a remarkable effect for reducing iron loss can be obtained by setting Zr content to 80 ppm or less in combination with the addition of REM. Although the reason is not apparent, it is believed that REM oxide and REM sulfide act as a nucleating site when fine precipitates such as Zr nitride and Al nitride are formed.

Figure 1:
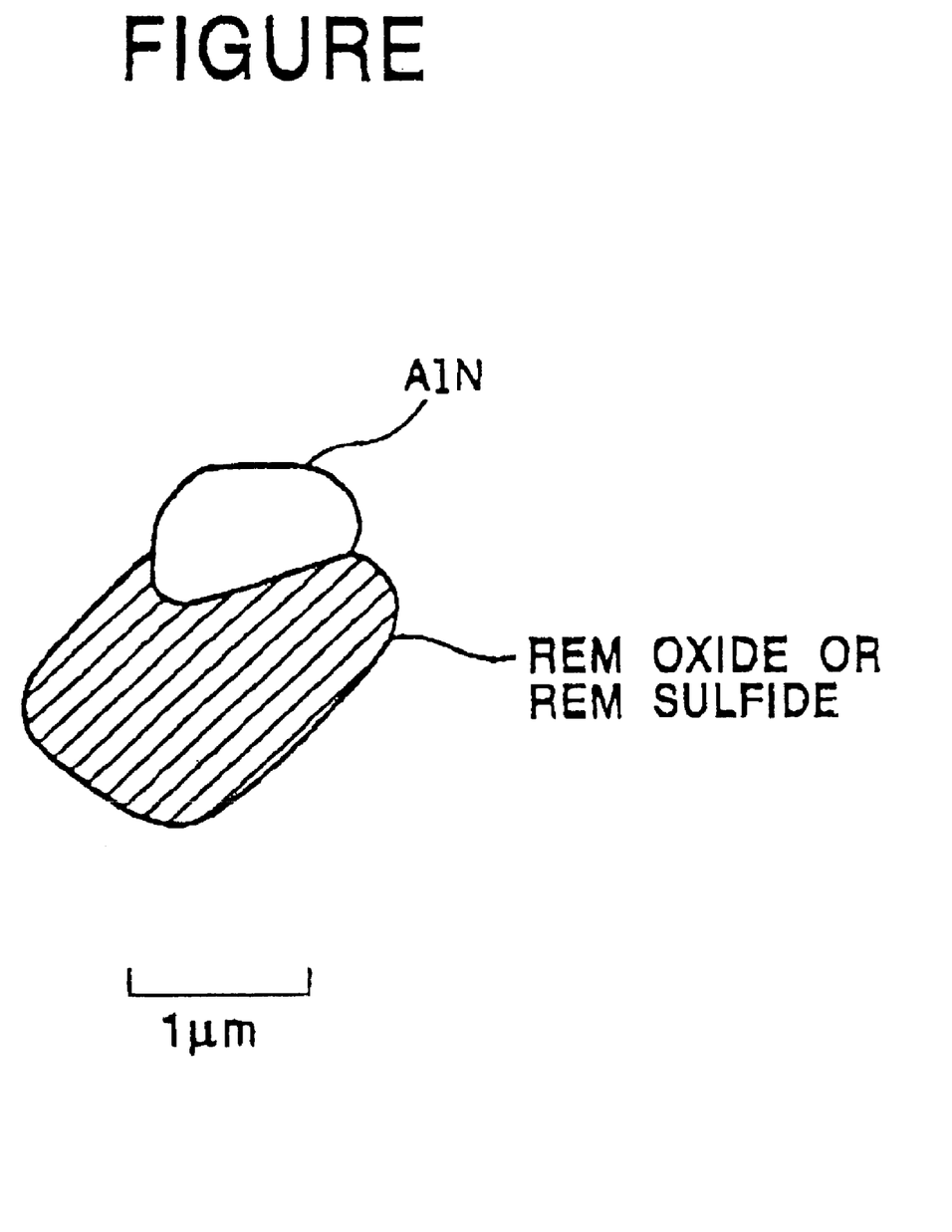
FIG. 1 is a conceptual view showing REM-containing inclusions coupled with nitride.

Furthermore, the grain growing property can be improved by controlling the form of the REM inclusions in a steel containing Al in an amount of 0.6 wt % or more as described below. More specifically, the grain growing property can be further improved by keeping the ratio of the number of REM-containing inclusions coupled with nitride to the number of REM-containing inclusions having a diameter of at least about 1 μm at 40% or more, together with an O content of 15 ppm or less, a S content of 20 ppm or less, and a N content of 30 ppm or less. The REM-containing inclusions coupled with nitride are, for example, made by REM-containing oxide and REM-containing sulfide coupled with nitride such as AlN and the like. This example is shown in FIG. 1. And the ratio of the number of this kind of the inclusions to the number of the entire REM-containing inclusions is regulated as to the REM-containing inclusions having the diameter of at least about 1 μm.

The reason is not apparent why the grain growing property is improved by the control of the form of the REM-containing inclusions and the limitation of the O content, the S content and the N content in the steel. However, it is believed that the grain growing property is improved by the reduction of the oxide, nitride, sulfide and the composite of them which form the precipitates in the steel to their possible limits and growing the nitride precipitate as large REM inclusions which do not affect the grain growing property in the stress relief annealing.

Furthermore, the amount of oxide on the surface of a high Al steel sheet can be reduced by including one or both of Sb and Sn in a total amount at least about 0.002 wt % and at most about 0.1 wt %. Sb and Sn are elements for suppressing surface oxidation. In particular, when at least one of Sb and Sn is added to the steel which contains basic components of the present invention, the surface oxidation can be more effectively suppressed so that a material having excellent properties can be stably obtained. When Sn and Sb are contained in an amount less than 0.002 wt %, they are not effective to suppress the surface oxidation. On the other hand, when the Sn and Sb content exceeds 0.1 wt %, significant amounts of Sn and Sb are segregated to the grain boundary, which obstructs their movement. Consequently, the grain growing property in the stress relief annealing is deteriorated. Accordingly, the Sb and Sn content is set to 0.1 wt % or less.

Although the components other than the above components are not particularly limited in the present invention, it is preferable to limit the contents of the following components.

P: 0.2 wt % or less

P can be added to improve the punching property. When, however, P content exceeds 0.2 wt %, a cold rolling property is deteriorated. Therefore, it is preferable to add P in an amount of 0.2 wt % or less.

S: 0.01 wt % or less

S forms MnS precipitate together with Mn. MnS obstructs the movement of a magnetic domain wall and the growth of grains, so the magnetic properties deteriorate. It is preferable to set the S content to 0.01 wt % or less, the less the better.

N: 0.01 wt % or less

N generates nitrides which obstruct the movement of the magnetic domain wall and the growth of the grains, so the magnetic properties deteriorate. It is preferable also to set the N-content to-0.01 wt % or less, the-less the better.

O: 50 ppm or less

When O is contained in an amount of more than 50 ppm, O generates oxides which obstruct the movement of the magnetic domain wall and the growth of the grains, so the magnetic properties deteriorate. It is preferable to set an O content to 50 ppm or less, the less the better.

Cu: 0.05 wt % or less

When Cu is contained in an amount exceeding 0.05 wt %, Cu generates Cu sulfide which obstructs the movement of the magnetic domain wall and the growth of the grains, so the magnetic properties deteriorate. It is preferable to set a Cu content to 0.05 wt % or less, the less the better.

Nb: 0.005 wt % or less

Nb generates Nb carbide or Nb nitride which obstructs the movement of the magnetic domain wall and the growth of the grains, so the magnetic properties deteriorate. It is preferable to set a Nb content to 0.005 wt % or less, the less the better.

B: 0.0005 wt % or less

B forms BN which obstructs the movement of the magnetic domain wall and the growth of the grains, so the magnetic properties deteriorate. It is preferable to set a B content to 0.0005 wt % or less, the less the better.

It is preferable to reduce elements such as V, Mo, Cr and the like which are concerned in the formation of the precipitates in steel such as oxide, nitride, sulfide and the like as much as possible among the inevitable impurities in combination with the reduction of the amounts of O, N and C.

In the present invention, the amount of oxygen on the metal surface layer of a steel sheet should be set to 1.0 g/m$^2$ or less on the completion of finish annealing after the above-mentioned components are adjusted as described above.

The inventors carefully considered the effect of Al as described above. When the inventors reduced iron loss by increasing the amount of Al, the inventors confirmed that prescribed iron loss could be obtained according to conventional knowledge. However, it was difficult to obtain stable magnetic properties because the magnetic properties were deviated after the stress relief annealing. At first, the inventors supposed that the deviation of magnetic properties was caused by the effect of impure elements and studied the effect of them. But studying the effect of impurity elements did not account for the deviation. After various examinations, the inventors made the new discovery that a nitriding phenomenon occurred during the stress relief-annealing and was a main factor of the deviation. This nitriding phenomenon depends upon surface scales which were produced when the sheet was subjected to the finish annealing in a steel containing Al in a large amount. More specifically, it was discovered that when the amount of oxygen on the metal surface layer exceeded 1.0 g/m$^2$, nitriding was remarkably accelerated. during the stress relief annealing which was executed after the finish annealing. As a result, the scales caused a magnetism deteriorating phenomenon and they were liable to be made by the increased amount of Al in the finish annealing. Although the reason why the magnetism deteriorating phenomenon was caused was not apparent, it was believed that the form of surface scales affected the nitriding phenomenon as the amount of oxygen increased.

The conditions for manufacturing a non-oriented electromagnetic steel sheet according to the present invention and also the reasons for those conditions-will now be described.

At first, a molten steel is manufactured according to a conventional steel-making process such as a converter—degassing process or the like. The molten steel is made into a slab by a continuous casting process or a casting—ingot-making process. In order to set the ratio of the number of REM-containing inclusions coupled with nitride to the number of REM-containing inclusions having a diameter of at least about 1 $\mu$m to 40% or more, O content in the steel to 15 ppm or less, a S content to 20 ppm or less and a N content to 30 ppm or less, which are the conditions to further improve a grain growing property in stress relief annealing, the following treatment is preferred:

(1) the O content in the molten steel is reduced to 25 ppm or less by sufficiently performing degassing—Al deoxidizing;

(2) the S content is adjusted to 40 ppm or less by adding a desulfurizing agent; and (3) thereafter the S content is suppressed to 20 ppm or less, the O content is suppressed to 15 ppm or less and the N content is adjusted to 30 ppm or less by adding REM.

Although REMs are elements that form oxides and sulfides, it is especially likely to couple with the oxygen in a steel. Thus, the O content remaining in the steel must be sufficiently reduced that enough desulfurizing can occur by formation of REM-sulfide. More specifically, the coupling of REM with O can be reduced sufficiently if the O content is set to 25 ppm or less in the steel before the REM is added. Consequently, the sulfide can be effectively created by REM. Since the thus created REM sulfide and oxide partly float at the time when REM is added, the O content in the steel is finally reduced to 15 ppm or less. Note, since the S content should be finally reduced to 20 ppm or less through the. desulfurization performed by the sulfide created by REM, the S content should be reduced to about 40 ppm before the addition of the REM. A desulfurizing agent such as an ordinary flux or the like can be used. On the other hand, although it is preferable to set the N content to about 40 ppm or less before the addition of REM, it is sufficient that it is finally adjusted to 30 ppm or less. Note, when the Al content in the steel is increased according to the present invention, there occurs a deoxidizing effect by Al, whereby the amount of oxygen in the steel is reduced before the addition of REM.

Another object of setting the O and S contents to 25 ppm or less and 40 ppm or less, respectively, before the addition of REM is to set the ratio of the number of the REM-containing inclusions coupled with nitride to the number of REM-containing inclusions having a diameter of at least about 1 $\mu$m in the steel to 40% or more. It is not apparent why the ratio of the number of the REM-containing inclusions coupled with nitride to the number of REM-containing inclusions having a diameter of at least about 1 $\mu$m can be set to 40% or more by the adjustment of the S and O contents before the addition of REM; however, it is believed that the N content is relatively increased by the reduction of the total amounts of O and S in the steel which are coupled with REM before the addition of REM so that the ratio of inclusions which are combined with Ti nitride and Zr nitride is increased. The Ti nitride and the Zr nitride are created when they are coupled with nitride during the steel being solidified and cooled. The reason why the grain growing property is improved by setting the ratio of the number of the REM-containing inclusions coupled with nitrogen to the number of REM-containing inclusions having a diameter of at least about 1 $\mu$m is as described above.

Subsequently the slab is hot rolled. The slab can be either reheated and then hot rolled or directly hot rolled without reheating. When a particularly high magnetic flux density is needed, the aggregate structure can be improved by coarsening crystal grains of a hot-rolled sheet by self-annealing performed during hot-rolled sheet coiling after hot rolling. Either box annealing (for example, 850° C.×1 hour) or continuous annealing (for example, 950° C.×2 minutes) is suitable as the hot-rolled sheet annealing.

The hot-rolled sheet is annealed continuously in a short time from the view of cost reduction and productivity improvement. But a high magnetic flux density cannot be obtained by conventional techniques when a hot-rolled sheet is annealed for a short time such as a soaking time of 30 seconds, because the crystal grains of the hot-rolled sheet are not sufficiently coarsened. However, since the grain growing property is improved by the present invention, a high magnetic flux density can be obtained even if the hot-rolled sheet is annealed for a relatively short time. The hot-rolled steel sheet must conventionally be annealed for at least about 5 minutes to obtain an excellent magnetic flux density. On the other hand, since the steel composition of the present invention is greatly improved in the grain growing property, the hot-rolled sheet can be annealed in a time shortened to 40 seconds or less. At that time, when the annealing temperature is less than about 750° C., the effect of coarsening crystal grains of the hot-rolled sheet by the annealing is small, whereas when the annealing temperature exceeds about 1150° C., the annealing becomes uneconomical. Thus, it is preferable to set the annealing temperature from 750° C. or more to 1150° C. or less.

Next, the hot-rolled sheet is made as a product either by cold rolling the hot-rolled sheet once so that it has the thickness of the product and then finish annealing the cold-rolled sheet, or by cold rolling the hot-rolled sheet twice with intermediate annealing performed therebetween and then finish annealing the cold-rolled sheet.

The finish annealing should be performed so that the amount of oxygen on the metal surface layer of the steel sheet is controlled to 1.0 g/m$^2$ or less after the completion of the finish annealing as described above. The amount of the oxygen on the metal surface layer of the steel sheet is controlled by adjusting at least one of the dew point and the gas atmosphere during the finish annealing. Incidentally, it is advantageous to set an oxygen potential represented by P(H$_2$O)/P(H$_2$) to 0.7 or less by adjusting, for example, either or both of the dew point and the gas atmosphere so that the finish annealing can be performed at 600° C. or more and 1100° C. or less. P(H$_2$O) represents a partial pressure of H$_2$O gas and P(H$_2$) represents a partial pressure of H$_2$ gas. The amount of oxygen on the metal surface layer of the steel sheet is mainly controlled by the atmosphere such as the dew point, a gas composition and the like, although it also depends on an annealing time, and it is sufficient to regulate the annealing time from the viewpoint of productivity. Since the steel composition according to the present invention is excellent in the grain growing property, it is possible to perform the finish annealing in a short time. That is, the finish annealing can be performed in 15 seconds or less in the temperature range from 750° C. or more and 900° C. or less. Needless to say, the amount of oxygen on the metal surface layer should be adjusted to 1.0 g/m$^2$ also at the time. As to the other finish annealing conditions, any of the conditions for manufacturing a non-oriented electromagnetic steel sheet excellent in iron loss after stress relief annealing is applicable.

It is possible to form an insulating film on the surface of the steel sheet and perform skin pass rolling of 2–10% after the finish annealing by known methods. The same effect can be obtained even if these processes are added.

EXAMPLES

Example 1

A slab containing the components shown in Table 1 was made by continuous casting after it was subjected to a converter—degassing process. The resulting slab was reheated and then hot rolled to form a hot-rolled steel sheet. Thereafter, the hot-rolled steel sheet was annealed for 25 seconds at 950° C. and rolled to form a cold-rolled steel sheet having a thickness of 0.5 mm by cold rolling including pickling. Subsequently, the cold-rolled steel sheet was finish annealed for 14 seconds at 800° C. in various annealing atmospheres and an insulating film was formed. In the finish annealing, a dew point was adjusted in a mixed gas atmosphere containing 35% H$_2$ and 65% N$_2$ so that the amount of oxygen on the surface layer of the steel sheet was controlled. Thereafter, stress relief annealing was performed for 2 hours at 750° C. in a dry nitrogen atmosphere, and magnetic properties were measured by a 25 cm Epstein method. Table 1 shows the result of the analysis of components, magnetic properties measurement and punching property evaluation, respectively. The punching property is evaluated by the burrs of a punched piece edge after punching to a shape having a 30 mm diameter with an SKD metal mold is performed 200,000 times. When a punched product had a burr exceeding 20 μm, the product was evaluated as an insufficiently punched product and provided with a mark x.

Mechanical strength was evaluated by the yield strength y$_p$ of a product sheet. A product having yield strength y$_p$ exceeding 300 N/mm$^2$ was marked with O which meant acceptable, whereas a product having yield strength y$_p$ less than 300 N/mm$^2$ was marked with x which meant unacceptable.

This is also applicable to the respective examples which will be described later.

TABLE 1

| | | Component (after finish annealing) | | | | | | | | | Amount of oxygen (g/m$^2$) | Evaluation W$_{15/50}$ (after stress relief) | Punching property* | Evaluation Mechanical property Y$_p$ (N/mm$^2$)** | Reference |
|---|---|---|---|---|---|---|---|---|---|---|---|---|---|---|---|
| No. | C (ppm) | Si | Al | Mn | P | REM (ppm) | Ti (ppm) | Zr (ppm) | Sb | Sn | | | | | |
| 1 | 28 | 0.6 | 0.68 | 0.3 | 0.03 | 5 | 10 | 20 | tr | tr | 0.1 | 2.9 | o | x | Comparative |
| 2 | 25 | 0.8 | 0.79 | 0.31 | 0.02 | 11 | 10 | 21 | tr | tr | 0.1 | 2.85 | o | x | Comparative |
| 3 | 23 | 1.21 | 0.25 | 0.28 | 0.03 | 5 | 11 | 32 | tr | tr | 0.1 | 2.88 | o | x | Comparative |
| 4 | 22 | 1.22 | 0.29 | 0.32 | 0.02 | 11 | 10 | 21 | tr | tr | 0.1 | 2.59 | o | o | Inventive |
| 5 | 24 | 1.21 | 2.28 | 0.32 | 0.01 | 4 | 12 | 19 | tr | tr | 0.09 | 2.43 | o | o | Inventive |
| 6 | 20 | 1.85 | 2.21 | 0.33 | 0.03 | 8 | 9 | 19 | tr | tr | 0.15 | 2.28 | o | o | Inventive |
| 7 | 29 | 2.2 | 1.59 | 0.31 | 0.04 | 10 | 9 | 26 | tr | tr | 0.15 | 2.28 | o | o | Inventive |
| 8 | 31 | 2.2 | 3.1 | 0.32 | 0.02 | 8 | 9 | 22 | tr | tr | 0.19 | 2.25 | x | o | Comparative |
| 9 | 33 | 3.8 | 1.8 | 0.36 | 0.04 | 12 | 9 | 21 | tr | tr | — | Cold rolling impossible | — | — | Comparative Example |
| 10 | 32 | 1.23 | 0.7 | 0.81 | 0.05 | 15 | 9 | 23 | tr | tr | 0.17 | 2.49 | o | o | Inventive |
| 11 | 32 | 1.26 | 1.6 | 2.3 | 0.03 | 11 | 9 | 21 | tr | tr | 0.16 | 2.26 | x | o | Comparative |
| 12 | 122 | 1.2 | 1.6 | 0.32 | 0.04 | 8 | 9 | 22 | tr | tr | 0.16 | 3.13 | o | o | Comparative |
| 13 | 22 | 1.2 | 1.6 | 0.31 | 0.03 | 7 | 6 | 21 | tr | tr | 0.1 | 2.38 | o | o | Inventive |
| 14 | 24 | 1.21 | 1.58 | 0.31 | 0.03 | 6 | 7 | 21 | tr | tr | 0.13 | 2.39 | o | o | Inventive |

TABLE 1-continued

| | Component (after finish annealing) | | | | | | | | | Evaluation | | | Evaluation | |
|---|---|---|---|---|---|---|---|---|---|---|---|---|---|---|
| | | | | | | | | | | Amount of | $W_{15/50}$ (after | Punching | Mechanical property | |
| No. | C (ppm) | Si | Al | Mn | P | REM (ppm) | Ti (ppm) | Zr (ppm) | Sb | Sn | oxygen (g/m²) | stress relief) | property* | $Y_p$ (N/mm²)** | Reference |
| 15 | 28 | 1.19 | 1.57 | 0.28 | 0.04 | 8 | 8 | 60 | tr | tr | 0.11 | 2.42 | ○ | ○ | Inventive |
| 16 | 26 | 1.2 | 1.59 | 0.29 | 0.02 | 8 | 7 | 90 | tr | tr | 0.13 | 2.99 | ○ | ○ | Comparative |
| 17 | 30 | 1.18 | 1.55 | 0.32 | 0.02 | 1 or | 6 | 30 | tr | tr | 0.14 | 2.91 | ○ | ○ | Comparative |
| 18 | 36 | 1.22 | 1.52 | 0.33 | 0.03 | 22 | 6 | 30 | tr | tr | 0.16 | 2.39 | ○ | ○ | Inventive |
| 19 | 25 | 1.21 | 1.61 | 0.31 | 0.05 | 23 | 6 | 30 | tr | tr | 0.19 | 2.41 | ○ | ○ | Inventive |
| 20 | 26 | 1.19 | 1.63 | 0.32 | 0.01 | 100 | 6 | 30 | tr | tr | 0.2 | 2.91 | ○ | ○ | Comparative |
| 21 | 28 | 1.2 | 1.59 | 0.33 | 0.03 | 7 | 13 | 23 | tr | tr | 0.3 | 2.4 | ○ | ○ | Inventive |
| 22 | 25 | 1.21 | 1.58 | 0.35 | 0.04 | 6 | 20 | 21 | tr | tr | 0.25 | 2.89 | ○ | ○ | Comparative |
| 23 | 29 | 1.22 | 1.54 | 0.34 | 0.01 | 1 or | 10 | 24 | tr | tr | 0.24 | 2.79 | ○ | ○ | Comparative |
| 24 | 23 | 1.22 | 1.58 | 0.32 | 0.03 | 6 | 10 | 25 | tr | tr | 0.8 | 2.39 | ○ | ○ | Inventive |
| 25 | 22 | 1.21 | 1.59 | 0.33 | 0.04 | 6 | 10 | 26 | tr | tr | 1.3 | 2.79 | ○ | ○ | Comparative |
| 26 | 21 | 1.21 | 1.56 | 0.34 | 0.02 | 11 | 10 | 21 | 0.05 | tr | 0.08 | 2.33 | ○ | ○ | Inventive |
| 27 | 22 | 1.15 | 1.58 | 0.32 | 0.03 | 12 | 9 | 22 | tr | 0.05 | 0.08 | 2.34 | ○ | ○ | Inventive |
| 28 | 24 | 1.16 | 1.59 | 0.3 | 0.02 | 13 | 8 | 25 | 0.05 | 0.05 | 0.06 | 2.31 | ○ | ○ | Inventive |

*○: good
x: poor
**○: $Y_p \geq 300$ N/mm²
x: $Y_p < 300$ N/mm²

It is found from Table 1 that the comparative examples Nos. 1 and 2 which contain Si in a small amount and the comparative example No. 3 which contained Al in a small amount could not provide low iron loss, the comparative example No. 9 which contained Si in an amount exceeding 3.5 wt % was broken during cold rolling, the comparative example No. 8 which contained Al in an amount exceeding 3.1 wt % was insufficiently punched, the comparative example No. 11 which contained Mn in an amount exceeding 2.0 wt % was also insufficiently punched, and the comparative example No. 12 which contained C in an amount exceeding 0.01 wt % had deteriorated magnetic properties.

The comparative examples Nos. 17 and 23 which contained no REM had magnetic properties of a low level even if they contained Ti and Zr in amounts of 15 ppm or less and 80 ppm or less, respectively, whereas when they contained REM and the Ti and Zr were contained therein in amounts of 15 ppm or less and 80 ppm or less, respectively, a remarkable iron loss reducing effect could be obtained. Note, the comparative examples Nos. 22 and 16 contained Ti and Zr in amounts exceeding 15 ppm and 80 ppm, respectively, and had deteriorated magnetic properties.

Next, the inventive examples Nos. 13, 24 and the comparative example No. 25 whose amounts of oxygen on the metal surface layer of the steel sheet exceeded 1.0 g/l² had deteriorated magnetic properties after the stress relief annealing. Furthermore, the inventive examples Nos. 26–28 had improved mechanical properties because an amount of scales was reduced by the addition of Sb and/or Sn.

Example 2

A slab containing the components shown in Table 2 was made by continuous casting after it was subjected to a converter—degassing process. CaO was added after the addition of Al. In the above processes, CaO was added into molten steel after Al was added, then REM was added, and the molten steel was stirred. Subsequently, the resulting slab was reheated and then hot rolled to form a hot-rolled steel sheet. Thereafter, the hot-rolled steel sheet was annealed in 20 seconds at 950° C. and rolled to form a cold-rolled steel sheet having a thickness of 0.5 mm by cold rolling including pickling. Subsequently, the cold-rolled steel sheet was finish annealed for 9 seconds at 800° C. and made into products. In the finish annealing, a dew point was adjusted in a mixed gas atmosphere containing 35% $H_2$ and 65% $N_2$ so that the amount of oxygen on the surface layer of the steel sheet was controlled. After the components of the resulting products were analyzed and the inclusions of the products were examined, test pieces were sampled and subjected to stress relief annealing for 2 hours at 750° C. in a dry nitrogen atmosphere, and magnetic properties were measured. The result of the investigation is summarized in Table 2.

TABLE 2

| | Composition (after finish annealing) | | | | | | | | | | | (*) Composition ratio of REM | Component before the addition of REM | | Evaluation | | |
|---|---|---|---|---|---|---|---|---|---|---|---|---|---|---|---|---|---|
| No | C ppm | Si | Al | Mn | (**) P | REM ppm | Ti ppm | Zr ppm | S (ppm) | O (ppm) | N (ppm) | inclusions (%) | S (ppm) | O (ppm) | Amount of oxygen (g/m²) | $W_{15/50}$ (after stress relief) | Reference |
| 1 | 23 | 1.23 | 1.61 | 0.31 | 0.03 | 9 | 6 | 10 | 25 | 18 | 33 | 26 | 50 | 18 | 0.1 | 2.38 | Inventive |

TABLE 2-continued

| | Composition (after finish annealing) | | | | | | | | | | Composition ratio of REM inclusions (%) (*) | Component before the addition of REM | | Evaluation | | |
|---|---|---|---|---|---|---|---|---|---|---|---|---|---|---|---|---|
| No | C ppm | Si | Al | Mn | P (**) | REM ppm | Ti ppm | Zr ppm | S (ppm) | O (ppm) | N (ppm) | | S (ppm) | O (ppm) | Amount of oxygen (g/m$^2$) | $W_{15/50}$ (after stress relief) | Reference |
| 2 | 21 | 1.22 | 1.59 | 0.29 | 0.03 | 10 | 6 | 10 | 15 | 8 | 21 | 46 | 36 | 16 | 0.1 | 2.25 | Inventive product |
| 3 | 22 | 1.21 | 1.6 | 0.3 | 0.03 | 11 | 6 | 11 | 16 | 8 | 23 | 30 | 56 | 18 | 0.1 | 2.35 | Inventive product |
| 4 | 23 | 1.22 | 1.61 | 0.31 | 0.03 | 10 | 6 | 12 | 17 | 9 | 25 | 33 | 38 | 27 | 0.1 | 2.34 | Inventive product |
| 5 | 22 | 1.21 | 1.58 | 0.3 | 0.03 | 11 | 5 | 15 | 45 | 17 | 22 | 23 | 62 | 26 | 0.1 | 2.36 | Inventive product |
| 6 | 23 | 1.22 | 1.6 | 0.29 | 0.02 | 9 | 6 | 16 | 19 | 9 | 33 | 45 | 37 | 19 | 0.1 | 2.35 | Inventive product |
| 7 | 23 | 1.21 | 1.6 | 0.29 | 0.02 | 9 | 5 | 16 | 19 | 19 | 35 | 45 | 36 | 18 | 0.1 | 2.36 | Inventive product |

(*) Composition ratio of REM inclusions: the ratio of the number of REM-containing inclusions coupled with nitride which are occupied in the REM-containing inclusions having a diameter of at least about 1 μm
(**) Inevitably mixed component The amount of oxygen on the surface layer of the steel sheet was controlled. Thereafter, stress relief annealing was performed for 2 hours at 750° C. in a dry nitrogen atmosphere, and magnetic properties were measured by the 25 cm Epstein method. Table 3 shows the results of the analysis of components, magnetism measurement and evaluated punching property, respectively.

It is found from Table 2 that an inventive product No. 2 which was more excellent in iron loss after stress relief annealing could be obtained by setting the amounts of S, O and N to 20, 15 and 30 ppm, respectively and setting the ratio of the number of nitride REM inclusions contained in REM inclusions to 40% or more. It can be found that the ratio of the number of the nitride REM inclusions was set to 40% or more by setting the amount of S to 40 ppm or less and the amount of O to 25 ppm or less before the addition of the REM.

Example 3

A slab containing the components shown in Table 3 was made by continuous casting after it was subjected to a converter—degassing process. The resulting slab was reheated and then hot rolled to form a hot-rolled steel sheet. Thereafter, the hot-rolled steel sheet was annealed in 25 seconds at 950° C. and rolled to form a cold-rolled steel sheet having a thickness of 0.5 mm by cold rolling including pickling. Subsequently, the cold-rolled steel sheet was finish annealed for 20 seconds at 810° C. in various annealing atmospheres and an insulating film was formed. In the finish annealing, a dew point was adjusted in a mixed gas atmosphere containing 35% $H_2$ and 65% $N_2$ to prepare various oxygen potentials $P(H_2O)/P(H_2)$ so that the

TABLE 3

| | Composition | | | | | | | | | | | |
|---|---|---|---|---|---|---|---|---|---|---|---|---|
| No. | Si | Al | Mn | REM (ppm) | Ti (ppm) | Zr (ppm) | N (ppm) (*) | $P(H_2O)/P(H_2)$ (**) | Annealing temperature (° C.) | Amount of oxygen (g/m$^2$) | (After stress relief) | Punching property *** | Reference |
| 1 | 1.19 | 1.61 | 0.31 | 8 | 10 | 25 | 30 | 0.002 | 810 | 0.02 | 2.37 | o | Inventive Example |
| 2 | 1.19 | 1.61 | 0.31 | 8 | 10 | 25 | 31 | 0.05 | 810 | 0.09 | 2.37 | o | Inventive Example |
| 3 | 1.19 | 1.61 | 0.31 | 8 | 10 | 25 | 30 | 0.2 | 810 | 0.12 | 2.38 | o | Inventive Example |
| 4 | 1.19 | 1.61 | 0.31 | 8 | 10 | 25 | 60 | 0.25 | 810 | 0.21 | 2.42 | o | Inventive Example |
| 5 | 1.19 | 1.61 | 0.31 | 8 | 10 | 25 | 70 | 0.5 | 810 | 0.41 | 2.44 | o | Inventive Example |
| 6 | 1.19 | 1.61 | 0.31 | 8 | 10 | 25 | 33 | 0.2 | 810 | 0.2 | 2.34 | o | Inventive Example |

TABLE 3-continued

| No. | Si | Al | Mn | REM (ppm) | Ti (ppm) | Zr (ppm) | (*) N (ppm) | (**) $P(H_2O)/P(H_2)$ | Annealing temperature (° C.) | Amount of oxygen (g/m$^2$) | (After stress relief) | Punching property *** | Reference |
|---|---|---|---|---|---|---|---|---|---|---|---|---|---|
| 7 | 1.21 | 2.1 | 0.32 | 9 | 12 | 25 | 91 | 0.8 | 810 | 1.1 | 2.88 | o | Comparative Example |
| 8 | 1.19 | 1.61 | 0.31 | 8 | 10 | 25 | 150 | 0.9 | 810 | 1.3 | 2.91 | o | Comparative Example |
| 9 | 1.19 | 1.61 | 0.31 | 8 | 10 | 25 | 80 | 0.4 | 950 | 0.6 | 2.43 | o | Inventive Example |
| 10 | 1.19 | 1.61 | 0.31 | 8 | 10 | 25 | 130 | 0.4 | 1150 | 1.3 | 2.71 | o | Comparative Example |
| 11 | 1.19 | 1.61 | 0.31 | 8 | 10 | 25 | 62 | 0.4 | 680 | 0.2 | 2.47 | o | Inventive Example |
| 12 | 1.19 | 1.61 | 0.31 | 8 | 10 | 25 | 30 | 0.4 | 550 | 0.2 | 2.91 | x | Comparative Example |

(*) N: Amount of nitriding after stress relief annealing
(**) Amount of oxygen on metal surface layer is changed.
o: good
x: poor It can be found from Table 3 that when the amount of oxygen on the metal surface layer of the steel sheet having been subjected to the finish annealing exceeded 1.0 g/m$^2$, iron loss was deteriorated. It can be assumed that the deterioration was caused by nitriding in the stress relief annealing because the amount of N abruptly increased at the time. The amount of oxygen on the metal surface layer could be controlled to a preferable range by regulating the oxygen potentials $P(H_2O)/P(H_2)$ of the atmosphere to 0.7 or less.

Example 4

A slab containing the components shown in Table 4 was made by continuous casting after it was subjected to a converter—degassing process. The resulting slab was reheated and then hot rolled to form a hot-rolled steel sheet. Thereafter, the hot-rolled steel sheet was annealed for 25 seconds 5 hours at 950° C. and rolled to form a cold-rolled steel sheet having a thickness of 0.5 mm by pickling/cold rolling. Subsequently, the cold-rolled steel sheet was finish annealed for 9 seconds or 30 seconds at 800° C. and made into products. In the finish annealing, a dew point was adjusted in a mixed gas atmosphere containing 35% H$_2$ and 65% N$_2$ to prepare various oxygen potentials $P(H_2O)/P(H_2)=0.002$ so that the amount of oxygen on the surface layer of the steel sheet was controlled to 0.02 g/m$^2$. After the components of the resulting products were analyzed and the inclusions of the products were examined, test pieces were sampled and subjected to stress relief annealing for 2 hours at 750° C. in a dry nitrogen atmosphere, and magnetic properties were measured. The result of the investigation is summarized in Table 4.

TABLE 4

| | Composition | | | | | | | Manufacturing conditions | | | | | Properties | | |
|---|---|---|---|---|---|---|---|---|---|---|---|---|---|---|---|
| | | | | | | | | Annealing for hot rolled sheet | | | Finish annealing | | Amount of oxygen (g/m$^2$) | $B_{50}$ (T) | $W_{15/50}$ (after stress relief) | |
| No. | Si | Al | Mn | REM (ppm) | Ti (ppm) | Zr (ppm) | (*) N (ppm) | | Temperature | Time | Temperature | Time | | | | Reference |
| 1 | 1.19 | 1.61 | 0.31 | 8 | 10 | 25 | 31 | Done | 950° C. | 25 sec | 800° C. | 30 sec | 0.02 | 1.74 | 2.38 | Inventive Example |
| 2 | 1.19 | 1.61 | 0.31 | 8 | 10 | 25 | 29 | Done | 950° C. | 1.5 min | 800° C. | 30 sec | 0.02 | 1.75 | 2.39 | Inventive Example |
| 3 | 1.19 | 1.61 | 0.31 | 8 | 10 | 25 | 30 | Done | 950° C. | 6.5 min | 800° C. | 30 sec | 0.02 | 1.75 | 2.42 | Inventive Example |
| 4 | 1.19 | 1.61 | 0.31 | 8 | 10 | 25 | 28 | Done | 830° C. | 5 hr | 800° C. | 30 sec | 0.02 | 1.76 | 2.3 | Inventive Example |
| 5 | 1.19 | 1.61 | 0.31 | 8 | 10 | 25 | 32 | Not done | — | — | 800° C. | 30 sec | 0.02 | 1.72 | 2.45 | Inventive Example |
| 6 | 1.19 | 1.61 | 0.31 | 8 | 10 | 25 | 30 | Done | 950° C. | 25 sec | 800° C. | 9 sec | 0.02 | 1.74 | 2.39 | Inventive Example |
| 7 | 1.2 | 1.59 | 0.32 | 0 | 17 | 20 | 30 | Done | 950° C. | 25 sec | 800° C. | 30 sec | 0.02 | 1.72 | 2.91 | Comparative Example |
| 8 | 1.2 | 1.59 | 0.32 | 0 | 17 | 20 | 31 | Done | 950° C. | 1.5 min | 800° C. | 30 sec | 0.02 | 1.71 | 2.9 | Comparative Example |
| 9 | 1.2 | 1.59 | 0.32 | 0 | 17 | 20 | 32 | Done | 950° C. | 6.5 | 800° C. | 30 | 0.02 | 1.71 | 2.89 | Compar- |

TABLE 4-continued

| | | | | Composition | | | | Manufacturing conditions | | | | | Properties | | | |
|---|---|---|---|---|---|---|---|---|---|---|---|---|---|---|---|---|
| | | | | | | | | Annealing | | | Finish | | Amount | | $W_{15/50}$ | |
| | | | | | | | (*) | for hot | | | annealing | | of | | (after | |
| No. | Si | Al | Mn | REM (ppm) | Ti (ppm) | Zr (ppm) | N (ppm) | rolled sheet | Temp- erature | Time | Temp- erature | Time | oxygen $(g/m^2)$ | $B_{50}$ (T) | stress relief) | Reference |
| | | | | | | | | | | min | | sec | | | | |
| 10 | 1.2 | 1.59 | 0.32 | 0 | 17 | 20 | 29 | Done | 830° C. | 5 hr | 800° C. | 30 sec | 0.02 | 1.73 | 2.78 | Compar- ative Example |
| 11 | 1.2 | 1.59 | 0.32 | 0 | 17 | 20 | 28 | Not done | — | — | 800° C. | 30 sec | 0.02 | 1.7 | 2.99 | Compar- ative Example |
| 12 | 1.2 | 1.59 | 0.32 | 0 | 17 | 20 | 29 | Done | 950° C. | 25 sec | 800° C. | 9 sec | 0.02 | 1.74 | 2.92 | Compar- ative Example |

(*) N: Amount of nitriding after stress relief

It is found from Table 4 that since the inventive examples to which REM was added and in which the amounts of Ti and Zr were reduced were excellent in stress relief annealing, the properties thereof were not deteriorated even if the hot-rolled steel sheet was annealed for a relatively short time of 40 seconds or less at 950° C., and the products, which were excellent particularly in magnetic flux density as compared with the products to which no REM was added, could be obtained. Furthermore, even if the annealing time was set to 30 seconds and 9 seconds, there was no difference between the grain growing properties. Therefore, it is possible. to perform the finish annealing for a short time of 15 seconds or less which is not conventionally employed.

It was discovered that the hot-rolled steel sheet annealing time and the finish annealing time could be reduced by the improvement of the grain growing property which was achieved by controlling the amounts of REM, Ti, Zr and the like. As a result, there is a large possibility that productivity can be greatly improved by the present invention.

Since the non-oriented electromagnetic steel sheet provided by the present invention includes preferable mechanical properties realized by the increase of Si and Al, the high magnetic flux density can be maintained without sacrificing the punching property as well as the very low iron loss can be obtained even after stress relief annealing. Accordingly, the non-oriented electromagnetic steel sheet of the present invention is ideal as a material for small high-efficiency motors suitable for use in household electrical appliances and the like.

What is claimed is:

1. A method of manufacturing a non-oriented electromagnetic steel sheet, comprising the steps of:

hot rolling and cold rolling a steel slab comprising about 0.01 wt % or less of C, greater than about 1.0 wt % and at most about 3.5 wt % of Si, at least about 0.6 wt % and at most about 3.0 wt % of Al, at least about 0.1 wt % and at most about 2.0 wt % of Mn, at least about 2 ppm and at most about 80 ppm of one or more rare earth metals (REM), a maximum content of Ti and Zr being about 15 ppm and 80 ppm, respectively to form a rolled steel sheet; and subjecting the thus rolled steel sheet to finish annealing in a gas atmosphere having a dew point and adjusting at least one of the dew point and the gas atmosphere to thereby control the amount of oxygen on the metal surface layer of the steel sheet to 1.0 g/m² or less.

2. The method of manufacturing a non-oriented electromagnetic steel sheet according to claim 1, wherein the steel slab further comprises at least about 0.002 wt % and at most about 0.1 wt % of at least one of Sb and Sn.

3. The method of manufacturing a non-oriented electromagnetic steel sheet according to claim 1, further comprising forming the steel slab by the steps of:

adding at least one rare earth metal (REM) to a melt of the steel after S and O in the steel melt are adjusted to 40 ppm or less and 25 ppm or less, respectively, thereby to reduce S and O to 20 ppm or less and 15 ppm or less, respectively, and adjusting N to 30 ppm or less so that the ratio of REM-containing inclusions coupled with nitride to REM-containing inclusions having a diameter of at least about 1 μm in the steel sheet is 40% or more after finish annealing; and casting the steel melt.

4. The method of manufacturing a non-oriented electromagnetic steel sheet according to claim 1, wherein the steel slab further comprises at least about 0.002 wt % and at most about 0.1 wt % of at least one of Sb and Sn, and further comprising forming the steel slab by the steps of:

adding REM to a melt of the steel after S and O in the steel melt are adjusted to 40 ppm or less and 25 ppm or less, respectively thereby to reduce S and O to 20 ppm or less and 15 ppm or less, respectively, and adjusting N to 30 ppm or less so that the ratio of REM-containing inclusions coupled with nitride to REM-containing inclusions having a diameter of at least about 1 μm in the steel sheet is 40% or more after finish annealing; and casting the steel melt.

5. The method of manufacturing a non-oriented electromagnetic steel sheet according to claim 1, wherein the hot-rolled sheet is annealed for at most about 40 seconds at a temperature of at least about 700° C. and at most about 1150° C. after hot-rolling.

6. The method of manufacturing a non-oriented electromagnetic steel sheet according to claim 2, wherein the hot-rolled sheet is annealed for at most about 40 seconds at a temperature of at least about 700° C. and at most about 1150° C. after hot-rolling.

7. The method of manufacturing a non-oriented electromagnetic steel sheet according to claim 3, wherein the hot-rolled sheet is annealed for at most about 40 seconds at a temperature of at least about 700° C. and at most about 1150° C. after hot-rolling.

8. The method of manufacturing a non-oriented electromagnetic steel sheet according to claim 4, wherein the hot-rolled sheet is annealed for at most about 40 seconds at a temperature of at least about 700° C. and at most about 1150° C. after hot-rolling.

9. The method of manufacturing a non-oriented electromagnetic steel sheet according to claim 1, wherein the finish annealing is performed for a soaking time of at most about 15 seconds at a temperature of at least about 750° C. and at most about 900° C.

10. The method of manufacturing a non-oriented electromagnetic steel sheet according to claim 2, wherein the finish annealing is performed for a soaking time of at most about 15 seconds at a temperature of at least about 750° C. and at most about 900° C.

11. The method of manufacturing a non-oriented electromagnetic steel sheet according to claim 3, wherein the finish annealing is performed for a soaking time of at most about 15 seconds at a temperature of at least about 750° C. and at most about 900° C.

12. The method of manufacturing a non-oriented electromagnetic steel sheet according to claim 4, wherein the finish annealing is performed for a soaking time of at most about 15 seconds at a temperature of at least about 750° C and at most about 900° C.

* * * * *